(12) United States Patent
Yoshiyama

(10) Patent No.: US 11,367,301 B2
(45) Date of Patent: Jun. 21, 2022

(54) FINGERPRINT AUTHENTICATION DEVICE, DISPLAY DEVICE AND FINGERPRINT AUTHENTICATION METHOD OF THE SAME

(71) Applicant: SAMSUNG DISPLAY CO., LTD., Yongin-si (KR)

(72) Inventor: Masahiko Yoshiyama, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/951,602

(22) Filed: Nov. 18, 2020

(65) Prior Publication Data

US 2021/0224513 A1 Jul. 22, 2021

(30) Foreign Application Priority Data

Jan. 22, 2020 (KR) .................. 10-2020-0008278

(51) Int. Cl.
*G06K 9/00* (2022.01)
*G06V 40/12* (2022.01)
*G06V 40/13* (2022.01)

(52) U.S. Cl.
CPC .......... *G06V 40/1353* (2022.01); *G06V 40/13* (2022.01); *G06V 40/1359* (2022.01); *G06V 40/1371* (2022.01)

(58) Field of Classification Search
CPC .......... G06K 9/00073; G06K 9/00013; G06K 9/0008; G06K 9/00093
See application file for complete search history.

(56) References Cited

U.S. PATENT DOCUMENTS

| | | | |
|---|---|---|---|
| 2006/0153431 A1* | 7/2006 | Ando ................. | G06K 9/00087 382/124 |
| 2017/0091526 A1* | 3/2017 | Archibald .......... | G06K 9/00093 |
| 2017/0140193 A1* | 5/2017 | Wang ................. | G06K 9/00046 |
| 2019/0205516 A1* | 7/2019 | Uno ........................ | G06F 21/32 |

FOREIGN PATENT DOCUMENTS

| | | |
|---|---|---|
| JP | 2009151682 | 7/2009 |
| JP | 4867601 | 2/2012 |
| JP | 5457203 | 4/2014 |
| KR | 10-0374695 | 3/2003 |
| KR | 10-0393753 | 7/2003 |
| KR | 10-2016-0133991 | 11/2016 |

* cited by examiner

*Primary Examiner* — Lixi C Simpson
(74) *Attorney, Agent, or Firm* — F. Chau & Associates, LLC

(57) ABSTRACT

A fingerprint authentication method and device, display device, and biometric security apparatus include: a fingerprint sensor; a minutiae extraction circuit connected to the fingerprint sensor; a minutiae storage circuit connected to the minutiae extraction circuit; and a minutiae match circuit connected to the minutiae extraction circuit and the minutiae storage circuit, wherein the minutiae match circuit includes a class-wise comparator having a first input connected to the minutiae extraction circuit for receiving sensed fingerprint minutiae from each class of a plurality of classes, a second input connected to the minutiae storage circuit for receiving stored fingerprint minutiae belonging to each same class of the plurality of classes, respectively, and an output providing a fingerprint authentication signal responsive to the class-wise comparator.

15 Claims, 9 Drawing Sheets

FINGERPRINT AUTHENTICATION DEVICE, DISPLAY DEVICE AND FINGERPRINT AUTHENTICATION METHOD OF THE SAME

CROSS-REFERENCE TO RELATED APPLICATION

This application claims priority under 35 U.S.C. § 119 to Korean Patent Application No. 10-2020-0008278, filed Jan. 22, 2020, which is hereby incorporated by reference for all purposes as if fully set forth herein.

FIELD

Exemplary embodiments of the present disclosure herein relate to a display device, and more particularly, to a display device having a fingerprint authentication function.

DISCUSSION OF RELATED ART

A multimedia electronic device such as a television, a mobile phone, a tablet computer, a navigation device, and/or a game machine, may have a display device for displaying an image. An electronic device may have a display device capable of providing a touch-based input method that allows a user to easily input information or commands in an intuitive and convenient manner, in addition to a general input method using, for example, a button, a keyboard, or a mouse.

A method using a fingerprint, which is one type of biometric information, is proposed as a user authentication means for online banking, product purchase, security or the like, and demand may increase for a display device having a fingerprint authentication function.

The above information as disclosed in this section is presented only as a basis for understanding the inventive concepts of the present disclosure, and does not constitute an admission of prior art.

SUMMARY

Exemplary embodiments of the present disclosure provide a display device and a fingerprint authentication method that may have improved fingerprint identification speeds.

An exemplary embodiment of the present disclosure provides a fingerprint authentication device comprising: a fingerprint sensor configured to sense a fingerprint and output a corresponding fingerprint sensing signal; and a readout circuit configured to determine whether the fingerprint sensing signal matches a stored fingerprint signal, wherein the readout circuit comprises: a minutiae extracting part configured to extract first minutiae based on the fingerprint sensing signal and output a minutiae detecting signal indicative of the first minutiae; a minutiae storage part configured to provide a minutiae recall signal indicative of second minutiae based on the stored fingerprint signal; a minutiae matching part configured to determine each of the first minutiae as belonging to any one of a plurality of classes, determine each of the second minutiae as belonging to any one of the plurality of classes, and compare first minutiae determined as belonging to each class of the plurality of classes with second minutiae determined as belonging to the same respective class of the plurality of classes to output a matching signal; and a determination part configured to output a fingerprint authentication signal in response to the matching signal.

In an embodiment, the minutiae matching part may sequentially compare first minutiae and second minutiae of a k-th class, where k is a natural number from 1 to N, and output the matching signal.

In an embodiment, the minutiae matching part may determine each of the first minutiae as belonging to any one of the N number of classes depending on distances between a first center point and the first minutiae of the minutiae detecting signal, and determine each of the second minutiae as belonging to any one of the N number of classes depending on distances between a second center point and the second minutiae of the minutiae recall signal.

In an embodiment, the minutiae matching part may determine each of the first minutiae as belonging to any one of the N number of classes depending on angles between a first reference line overlapping a first center point of the minutiae detecting signal and the first minutiae of the minutiae detecting signal, and determine each of the second minutiae as belonging to any one of the N number of classes depending on angles between a second reference line overlapping a second center point of the minutiae recall signal and the second minutiae of the minutiae recall signal.

In an embodiment, the minutiae extracting part may extract a center point, a ridge end, and a bifurcation of a fingerprint as the first minutiae on the basis of the fingerprint sensing signal.

In an embodiment, the minutiae extracting part may extract the second minutiae of the fingerprint sensing signal in a fingerprint setting mode and output a minutiae setting signal including the second minutiae, and the minutiae storage part may store the minutiae setting signal and output the minutiae recall signal in response to a request from the minutiae matching part.

In an embodiment, a display device includes a display unit configured to display an image, a fingerprint sensing part configured to sense a fingerprint and output a fingerprint sensing signal, and a readout circuit configured to determine whether the fingerprint sensing signal matches a stored fingerprint signal. The readout circuit may include: a minutiae extracting part configured to extract first minutiae of the fingerprint sensing signal and output a minutiae detecting signal including the first minutiae; a minutiae storage part configured to provide a minutiae recall signal including second minutiae; a minutiae matching part configured to determine each of the first minutiae as belonging to any one of N number of classes, where N is a natural number, determine each of the second minutiae as belonging to any one of the N number of classes, and compare a first minutia of the first minutiae and a second minutia of the second minutiae determined as belonging to the same class to output a matching signal; and a determination part configured to output a fingerprint authentication signal in response to the matching signal.

In an embodiment, the minutiae matching part may sequentially compare first minutiae and second minutiae of a k-th class, where k is a natural number from 1 to N, and output the matching signal.

In an embodiment, the minutiae matching part may determine each minutia of the first minutiae as belonging to any one of the N number of classes depending on distances between a first center point and the first minutiae of the minutiae detecting signal, and determine each minutia of the second minutiae as belonging to any one of the N number of classes depending on distances between a second center point and the second minutiae of the minutiae recall signal.

In an embodiment, the minutiae matching part may determine Q1 number of first minutiae closest to the first center point and Q2 number of second minutiae closest to the second center point, where each of Q1 and Q2 is a natural number, as belonging to a first class of the N number of classes.

In an embodiment, the minutiae matching part may compare the first minutiae and the second minutiae determined as belonging to the first class.

In an embodiment, the minutiae matching part may determine R1 number of first minutiae farthest from the first center point and R2 number of second minutiae farthest from the second center point as belonging to an N-th class of the N number of classes, where each of R1 and R2 is a natural number.

In an embodiment, the minutiae matching part may compare the first minutiae and the second minutiae determined as belonging to the N-th class.

In an embodiment, the minutiae matching part may determine each of the first minutiae as belonging to any one of the N number of classes depending on angles between a first reference line overlapping a first center point of the minutiae detecting signal and the first minutiae of the minutiae detecting signal, and determine each of the second minutiae as belonging to any one of the N number of classes depending on angles between a second reference line overlapping a second center point of the minutiae recall signal and the second minutiae of the minutiae recall signal.

In an embodiment, the minutiae extracting part may extract a center point, a ridge end, and a bifurcation of a fingerprint as the first minutiae on the basis of the fingerprint sensing signal.

In an embodiment, the minutiae extracting part may extract the second minutiae of the fingerprint sensing signal in a fingerprint setting mode and output a minutiae setting signal including the second minutiae, and the minutiae storage part may store the minutiae setting signal and output the minutiae recall signal in response to a request from the minutiae matching part.

In an embodiment, the fingerprint authentication signal may be a signal indicating whether the fingerprint sensing signal matches the stored fingerprint signal.

An exemplary embodiment of the present disclosure provides a fingerprint authentication method comprising: receiving a fingerprint sensing signal responsive to a first fingerprint; extracting first minutiae based on the fingerprint sensing signal, and providing a minutiae detecting signal indicative of the first minutiae; receiving a minutiae recall signal responsive to a second fingerprint and indicative of second minutiae; determining each of the first minutiae as belonging to any one of a plurality of classes; determining each of the second minutiae as belonging to any one of the plurality of classes; for each of the plurality of classes, comparing the first minutiae of the class with the second minutiae of the class; providing a matching signal responsive to the comparing; and outputting a fingerprint authentication signal in response to the matching signal.

In an embodiment, the outputting of the matching signal may include determining each of the first minutiae as belonging to any one of the N number of classes depending on distances between a first center point and the first minutiae of the minutiae detecting signal, and determining each of the second minutiae as belonging to any one of the N number of classes depending on distances between a second center point and the second minutiae of the minutiae recall signal.

In an embodiment, the outputting of the matching signal may include determining each of the first minutiae as belonging to any one of the N number of classes depending on angles between a first reference line overlapping a first center point of the minutiae detecting signal and the first minutiae of the minutiae detecting signal, and determining each of the second minutiae as belonging to any one of the N number of classes depending on angles between a second reference line overlapping a second center point of the minutiae recall signal and the second minutiae of the minutiae recall signal.

An exemplary embodiment of the present disclosure provides a biometric security apparatus including: a fingerprint sensor; a minutiae extraction circuit connected to the fingerprint sensor; a minutiae storage circuit connected to the minutiae extraction circuit; and a minutiae match circuit connected to the minutiae extraction circuit and the minutiae storage circuit, wherein the minutiae match circuit includes a class-wise comparator having a first input connected to the minutiae extraction circuit for receiving sensed fingerprint minutiae from each class of a plurality of classes, a second input connected to the minutiae storage circuit for receiving stored fingerprint minutiae belonging to each same class of the plurality of classes, respectively, and an output providing a fingerprint authentication signal responsive to the class-wise comparator.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to describe principles of the present disclosure. In the drawings.

DETAILED DESCRIPTION

Figure 1:
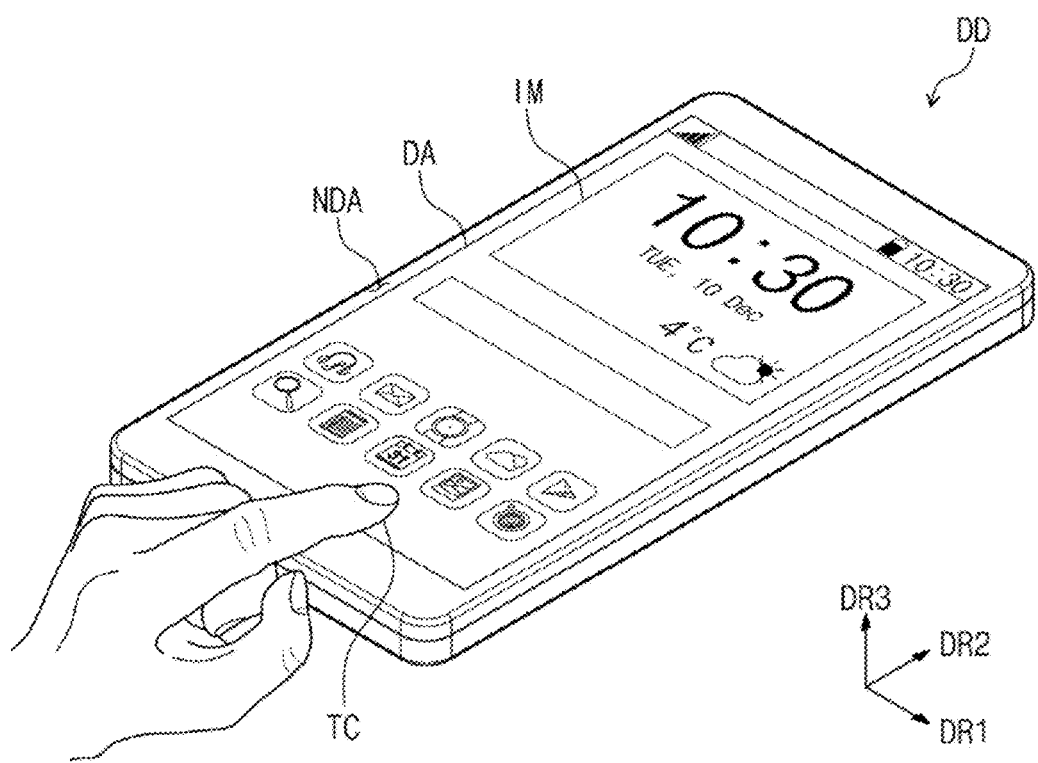
FIG. 1 is a perspective view diagram of a display device according to an exemplary embodiment of the present disclosure.

In the description that follows, it shall be understood that when an element or layer is referred to as being "on", "connected to" or "coupled to" another element or layer, it can be directly on, connected or coupled to the other element or layer, or intervening elements or layers may be present.

Like reference numerals may refer to like elements throughout this specification. In the figures, the thicknesses, ratios and dimensions of elements may be exaggerated for effective description of the technical contents. As used herein, the term "and/or" includes any and all combinations of one or more of the associated listed items.

As customary in the field, some exemplary embodiments are described and illustrated in the accompanying drawings in terms of functional blocks, units, and/or modules. Those skilled in the art will appreciate that these blocks, units, and/or modules are physically implemented by electronic and/or optical circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software, such as but not limited to microcode, to perform various functions discussed herein and may optionally be driven by firmware and/or software. It is also contemplated that each block, unit, and/or module may be implemented by dedicated hardware, or as a combination of dedicated hardware to perform some functions and a processor such as one or more programmed microprocessors and associated circuitry to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

FIG. 1 shows a perspective view of a display device according to an embodiment of the present disclosure.

FIG. 1 illustrates a portable terminal as an example of a display device DD according to an embodiment of the present disclosure. A portable terminal may include a tablet PC, a smartphone, a personal digital assistant (PDA), a portable multimedia player (PMP), a game machine, a wrist watch type electronic device, or the like. However, embodiments of the present disclosure are not limited thereto. An embodiment of the present disclosure may be employed in large-sized electronic devices such as a television and/or outdoor digital signage, and in small and medium-sized electronic devices such as a personal computer, a laptop computer, a kiosk, a car navigation device, and/or a camera. These are merely exemplary embodiments, and it goes without saying that an embodiment of the present disclosure may also be employed in other electronic devices without departing from the scope and spirit of the present disclosure.

As illustrated in FIG. 1, a display surface on which an image IM is displayed is parallel to a plane defined by a first direction DR1 and a second direction DR2. The display device DD includes a plurality of areas divided on the display surface. The display surface includes a display area DA in which the image IM is displayed, and a non-display area NDA adjacent to the display area DA. The non-display area NDA may be referred to as a bezel area. As an example, the display area DA may be in a quadrangular shape. The non-display area NDA surrounds the display area DA. Although not illustrated, a partially curved shape, for example, may also be included in the display device DD. As a result, a portion of the display area DA may have a curved shape.

A first surface, such as a front surface or a top surface, and a second surface, such as a rear surface or a bottom surface, of each of a plurality of members are defined in relation to a direction in which the image IM is displayed, that is, a third direction DR3. However, directions indicated by the first to third directions DR1 to DR3 are relative, and thus may be converted into different directions.

The display device DD according to an embodiment of the present disclosure may detect a user input TC applied from the outside. The user input includes various types of external inputs such as a touch by a part of a user's body, light, heat, and pressure. Although, in this embodiment, the user input is described as a touch by a user's hand applied to a front surface of the display device DD, this is exemplary and the user input TC may be provided in various types as described above. In addition, the display device DD may detect a user input applied to a side surface or a rear surface of the display device DD according to the structure of the display device DD, and is not limited to the input TC on the first surface of the present embodiment.

Figure 2:
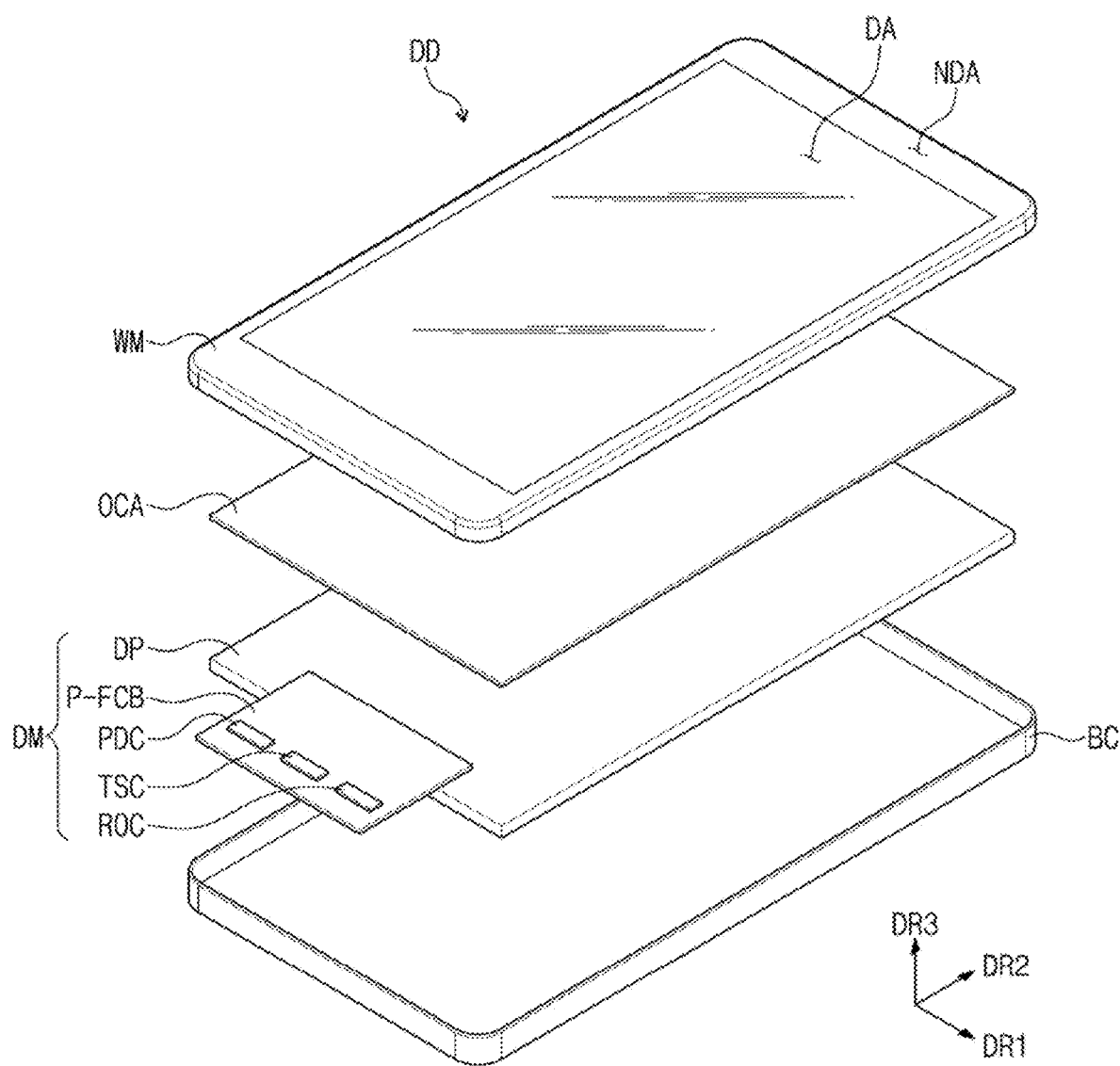
FIG. 2 is an exploded view diagram of a display device according to an exemplary embodiment of the present disclosure.

FIG. 2 shows an exploded view of a display device according to an embodiment of the present disclosure. In FIG. 2, components of the display device DD are schematically illustrated to describe a stacked relationship thereof.

As illustrated in FIG. 2, the display device DD includes a window member WM, an adhesive member OCA, a display module DM, and a bottom case BC. The display module DM includes a display panel DP, a panel circuit board P-FCB, a panel driving circuit PDC, a touch sensing circuit TSC, and a readout circuit ROC.

The window member WM provides the front surface of the display device DD illustrated in FIG. 1. The window member WM may include a glass substrate, a sapphire substrate, a plastic substrate, or the like. In addition, the window member WM may include a functional coating layer such as an anti-fingerprint layer, an anti-reflection layer, and/or a hard coating layer. Although, in an exemplary embodiment, the window member WM is illustrated to have a flat shape in the display area DA, the shape of the window member WM may be changed. Edges of the window member WM facing each other in the first direction DR1 may also provide a curved surface.

The display panel DP is disposed on a rear surface of the window member WM and generates an image. In addition, the display panel DP may sense the user input TC of FIG. 1, such as, for example, a touch and/or pressure applied by a user. Although the display panel DP is illustrated to provide a flat display surface in this embodiment, the shape of the display panel DP may be modified. For example, edges of the display panel DP facing each other in the first direction DR1 may be bent to provide a curved surface.

The display panel DP may include at least one of various types of display elements. For example, each of the display elements may be a liquid crystal capacitor, an organic light emitting diode, an electrophoretic element, or an electrowetting element. In an exemplary embodiment, the display panel DP may include an organic light emitting diode as a display element. That is, the display panel DP according to an embodiment of the present disclosure may be a flexible display panel, such as, for example, a flexible organic light emitting display panel.

A display unit for outputting an image, a touch sensing unit for sensing the user input TC of FIG. 1, and a fingerprint sensing unit for sensing a fingerprint from the user input TC of FIG. 1 may be included in the display panel DP.

The adhesive member OCA is disposed between the window member WM and the display panel DP. The adhesive member OCA may be an optically transparent adhesive member.

One end of the panel circuit board P-FCB may be bonded to pads disposed in one area of the display panel DP and electrically connected to the display panel DP. According to an embodiment, the panel driving circuit PDC, the touch sensing circuit TSC, and the readout circuit ROC may be mounted on the panel circuit board P-FCB in a chip on film (COF) method. Although not separately illustrated, a plurality of passive elements and active elements may further be mounted on the panel circuit board P-FCB. The panel circuit board P-FCB may provide an electrical signal to the display panel DP through signal lines. The panel circuit board P-FCB may be implemented as a flexible printed circuit board. The other end of the panel circuit board P-FCB may be electrically connected to other components of the display device DD.

Figure 3:
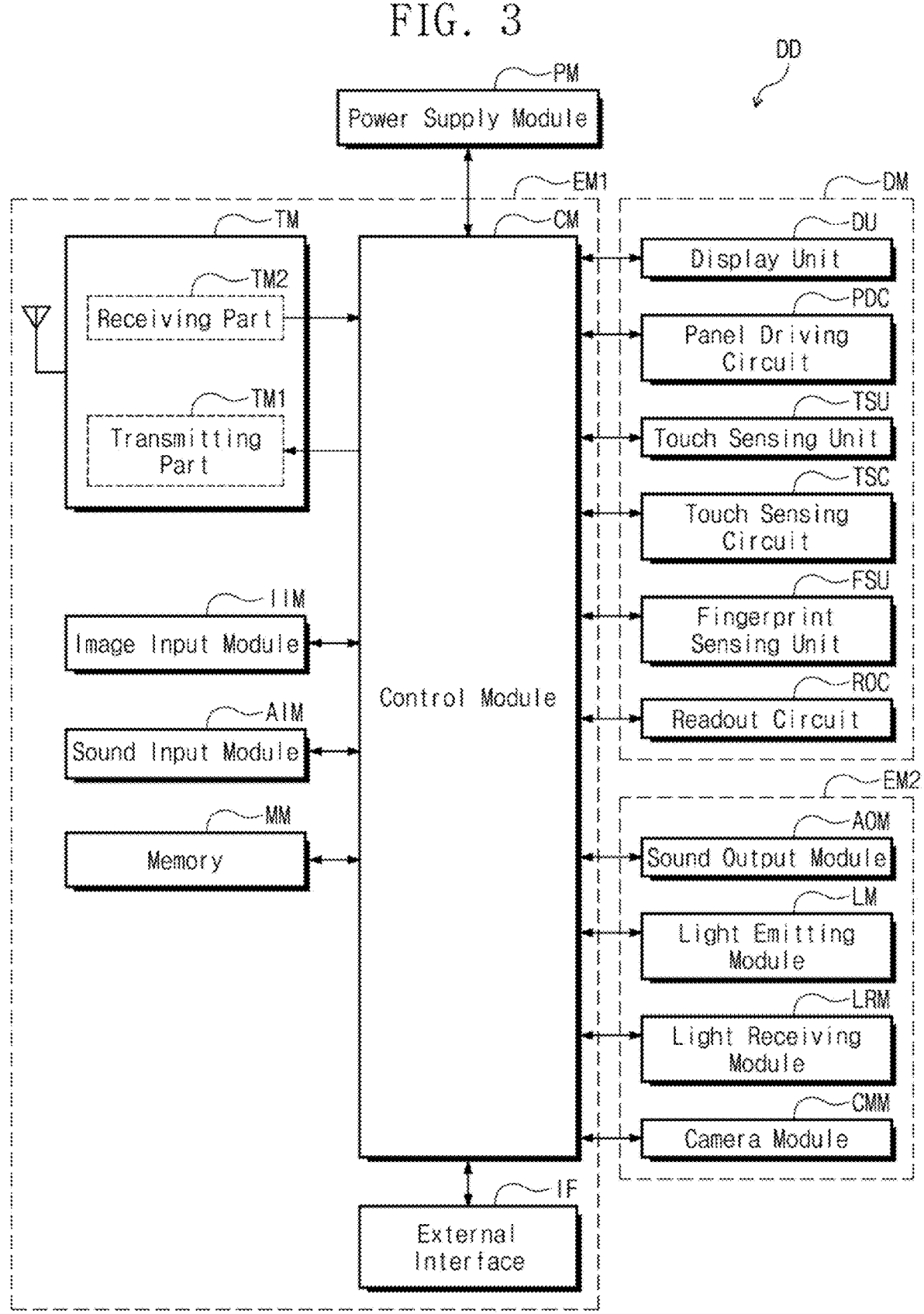
FIG. 3 is a schematic block diagram of the display device illustrated in FIG. 1.

FIG. 3 shows the display device illustrated in FIG. 1.

Referring to FIG. 3, the display device DD may include the display module DM, a power supply module PM, a first electronic module EM1, and a second electronic module EM2. The display module DM, the power supply module PM, the first electronic module EM1, and the second electronic module EM2 may be electrically connected to each other.

FIG. 3 illustrates a display unit DU, the panel driving circuit PDC, a touch sensing unit TSU, the touch sensing circuit TSC, a fingerprint sensing unit FSU, and the readout circuit ROC among components of the display module DM.

The display unit DU, the touch sensing unit TSU, and the fingerprint sensing unit FSU may be included in the display panel DP illustrated in FIG. 2. That is, each of the display unit DU, the touch sensing unit TSU, and the fingerprint sensing unit FSU may be of a "layer" type.

In another embodiment, each of a display unit DU, a touch sensing unit TSU, and a fingerprint sensing unit FSU may be of a "panel" type. The "panel" type may include a base layer that provides a base surface, such as a synthetic resin film, a composite material film, and a glass substrate, but the "layer" type may omit the base layer. In other words, a display unit DU, a touch sensing unit TSU, and a fingerprint sensing unit FSU which are of the "layer" type may be sequentially laminated on one base layer. The laminated order of the display unit DU, the touch sensing unit TSU, and the fingerprint sensing unit FSU which are of the "layer" type may be variously changed.

A display unit DU, a touch sensing unit TSU, and a fingerprint sensing unit FSU which are of the "panel" type may each be constituted as a separate panel and may be bonded to each other by an adhesive member. The bonded order of the display panel DU, the touch sensing unit TSU, and the fingerprint sensing unit FSU which are of the "panel" type may be variously changed.

The panel driving circuit PDC may perform control so that an image is displayed on the display unit DU. In an exemplary embodiment, the panel driving circuit PDC may perform control so that an image is displayed on the display unit DU, in response to a control signal and an image signal provided from a control module CM. In addition, the panel driving circuit PDC may control operations of the touch sensing circuit TSC and the readout circuit ROC.

The touch sensing circuit TSC may receive a touch sensing signal from the touch sensing unit TSU and detect the position of the user input TC of FIG. 1.

The readout circuit ROC may receive a fingerprint sensing signal from the fingerprint sensing unit FSU to detect a fingerprint from the user input TC of FIG. 1, and may determine whether the detected fingerprint matches a stored fingerprint. The readout circuit ROC may provide the panel driving circuit PDC and/or the control module CM with a signal indicating whether the detected fingerprint matches the stored fingerprint. A detailed configuration and operation of the readout circuit ROC may be described in detail further below.

The panel driving circuit PDC, the touch sensing circuit TSC, and the readout circuit ROC may be mounted on the panel circuit board P-FCB as illustrated in FIG. 2. In another embodiment, a panel driving circuit PDC, a touch sensing circuit TSC, and a readout circuit ROC may be mounted on circuit boards different from each other and then electrically connected to each other through a connecting board.

In another embodiment, a fingerprint sensing unit FSU and a readout circuit ROC may constitute a fingerprint authentication device separate from a display module DM.

The power supply module PM supplies power required for the overall operations of the display device DD. The power supply module PM may include a battery module.

The first electronic module EM1 and the second electronic module EM2 include various functional modules for operating the display device DD. The first electronic module EM1 may be mounted directly on a motherboard electrically connected to the display module DM, or may be mounted on a separate board to be electrically connected to the motherboard through a connector or the like.

The first electronic module EM1 may include the control module CM, a wireless communications module TM, an image input module IIM, a sound input module AIM, memory MM, and an external interface IF. Some of the modules may also be electrically connected to the motherboard through a flexible circuit board instead of being mounted on the motherboard.

The control module CM controls the overall operations of the display device DD. The control module CM may be a microprocessor. For example, the control module CM activates or deactivates the display module DM. The control module CM may control other modules such as the image input module IIM and the sound input module AIM on the basis of a touch signal received from the display module DM. The control module CM may perform user authentication on the basis of a fingerprint sensing signal received from the fingerprint sensing unit FSU.

The wireless communications module TM may transmit/receive a radio signal to/from another terminal by using, for example, a Bluetooth or Wi-Fi channel, without limitation. The wireless communications module TM may transmit/receive a voice signal by using a general communications channel. The wireless communications module TM includes a transmitting part TM1 for modulating and transmitting a signal to be transmitted, and a receiving part TM2 for demodulating a received signal.

The image input module IIM processes an image signal and converts the processed image signal into image data that may be displayed on the display module DM. The sound input module AIM receives an external sound signal using a microphone in a recording mode, a voice recognition mode or the like, and converts the received external sound signal into electrical voice data.

The external interface IF serves as an interface which is connected to an external charger, a wired/wireless data port, a card socket such as a memory card and/or a SIM/UIM card, or the like.

The second electronic module EM2 may include a sound output module AOM, a light emitting module LM, a light receiving module LRM, a camera module CMM, or the like. The components described above may be mounted directly on the motherboard, may be mounted on a separate board to be electrically connected to the display module DM via a connector or the like, or may be electrically connected to the first electronic module EM1.

The sound output module AOM converts sound data received from the wireless communications module TM or sound data stored in the memory MM and outputs the converted sound data to the outside.

The light emitting module LM generates and outputs light. The light emitting module LM may output infrared rays. The light emitting module LM may include an LED element. The light receiving module LRM may sense infrared rays. The light receiving module LRM may be activated when infrared rays having a predetermined level or higher are sensed. The light receiving module LRM may include a CMOS sensor. After infrared rays generated by the light emitting module LM are output, the infrared rays may be reflected by an external object such as a user's finger or face, and the reflected infrared rays may be incident on the light receiving module LRM. The camera module CMM captures an external image.

Figure 4:
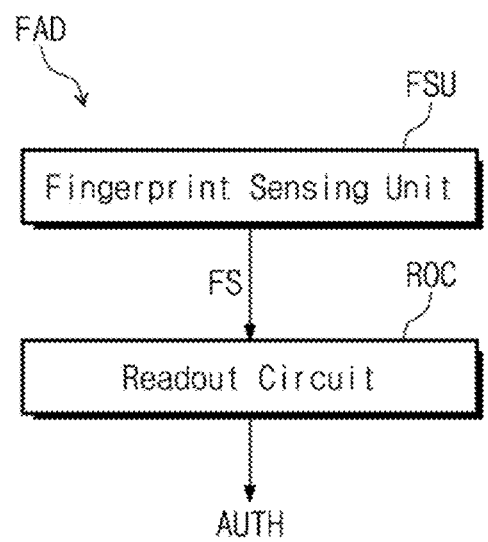
FIG. 4 is a schematic block diagram illustrating a fingerprint authentication device according to an exemplary embodiment of the present disclosure.

FIG. 4 shows a fingerprint authentication device according to an embodiment of the present disclosure.

Referring to FIG. 4, a fingerprint authentication device FAD includes the fingerprint sensing unit FSU and the readout circuit ROC. The fingerprint sensing unit FSU senses a user's fingerprint and outputs a fingerprint sensing signal FS corresponding to the sensed fingerprint.

The readout circuit ROC receives the fingerprint sensing signal FS from the fingerprint sensing unit FSU. The readout circuit ROC determines whether the fingerprint sensing signal FS matches a pre-stored fingerprint signal, and outputs a fingerprint authentication signal AUTH. For example, the fingerprint authentication signal AUTH may be at a first level such as a high level when the fingerprint sensing signal FS matches the pre-stored fingerprint signal, and the fingerprint authentication signal AUTH may be at a second level such as a low level when the fingerprint sensing signal FS does not match the pre-stored fingerprint signal.

The fingerprint authentication device FAD may be provided in the display device DD illustrated in FIG. 1, but an embodiment of the present disclosure is not limited thereto. The fingerprint authentication device FAD may be applied to various electronic devices requiring user authentication, such as a personal computer, a door lock, a navigation device, a safe, an ATM, and a payment terminal, without limitation.

Figure 5:
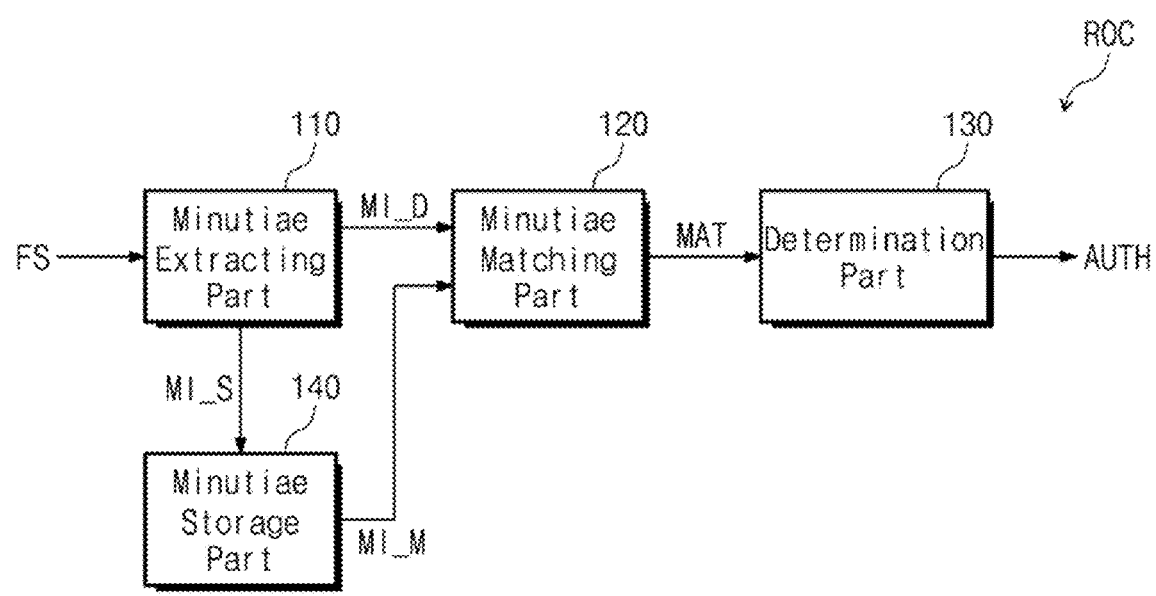
FIG. 5 is a schematic block diagram illustrating a configuration of a readout circuit according to an exemplary embodiment of the present disclosure.

FIG. 5 shows a configuration of a readout circuit according to an embodiment of the present disclosure. The readout circuit ROC illustrated in FIG. 3 and the readout circuit ROC illustrated in FIG. 4 may include components of the readout circuit ROC illustrated in FIG. 5. For convenience of description, the readout circuits illustrated in FIGS. 3, 4, and 5 are denoted by the same reference numeral 'ROC', but need not be the same.

Referring to FIG. 5, the readout circuit ROC includes a minutiae extracting part 110, a minutiae matching part 120, a determination part 130, and a minutiae storage part 140.

The minutiae extracting part 110 receives the fingerprint sensing signal FS from the fingerprint sensing unit FSU, such as in FIGS. 3 and 5. The fingerprint sensing signal FS may include information about a fingerprint sensed from the user input TC of FIG. 1. A fingerprint includes ridges and valleys. For example, the fingerprint sensing unit FSU may generate an electrical signal corresponding to light reflected by the ridges of the fingerprint, or generate an electrical signal corresponding to light reflected by the valleys between the ridges. The amount of light the fingerprint sensing unit FSU senses may vary according to the shape of the fingerprint reflecting the light, and electrical signals having different levels may be generated according to the amount of the sensed light. The minutiae extracting part 110 may determine ridges and valleys of an image of the fingerprint through a processing operation on the fingerprint sensing signal FS.

In addition, the minutiae extracting part 110 extracts minutiae of the fingerprint from the fingerprint sensing signal FS. The minutiae of the fingerprint refer to points representing fine features such as a center point, a ridge end, and a bifurcation, which are found in the image of the fingerprint. These minutiae of the fingerprint may be used to detect or identify the fingerprint by comparing the minutiae of the fingerprint with minutiae of a pre-stored or pre-registered fingerprint. The minutiae extracting part 110 may output the extracted minutiae as one of a minutiae detecting signal MI_D and a minutiae setting signal MI_S. The minutiae detecting signal MI_D output from the minutiae extracting part 110 is provided to the minutiae matching part 120. The minutiae setting signal MI_S output from the minutiae extracting part 110 is provided to the minutiae storage part 140.

The minutiae storage part 140 stores the minutiae setting signal MI_S from the minutiae extracting part 110. The minutiae storage part 140 may be nonvolatile memory, such as flash memory, that retains stored data even when the power of the minutiae storage part 140 is turned off. The minutiae storage part 140 may provide a minutiae recall signal MI_M to the minutiae matching part 120 in response to a request from the minutiae matching part 120.

The minutiae matching part 120 compares the minutiae detecting signal MI_D from the minutiae extracting part 110 with the minutiae recall signal MI_M from the minutiae storage part 140, and outputs a matching signal MAT corresponding to the comparison result.

The determination part 130 receives the matching signal MAT from the minutiae matching part 120, and outputs the fingerprint authentication signal AUTH. The fingerprint authentication signal AUTH may be a signal indicating whether the fingerprint sensing signal FS corresponds to the pre-stored fingerprint.

Figure 6:
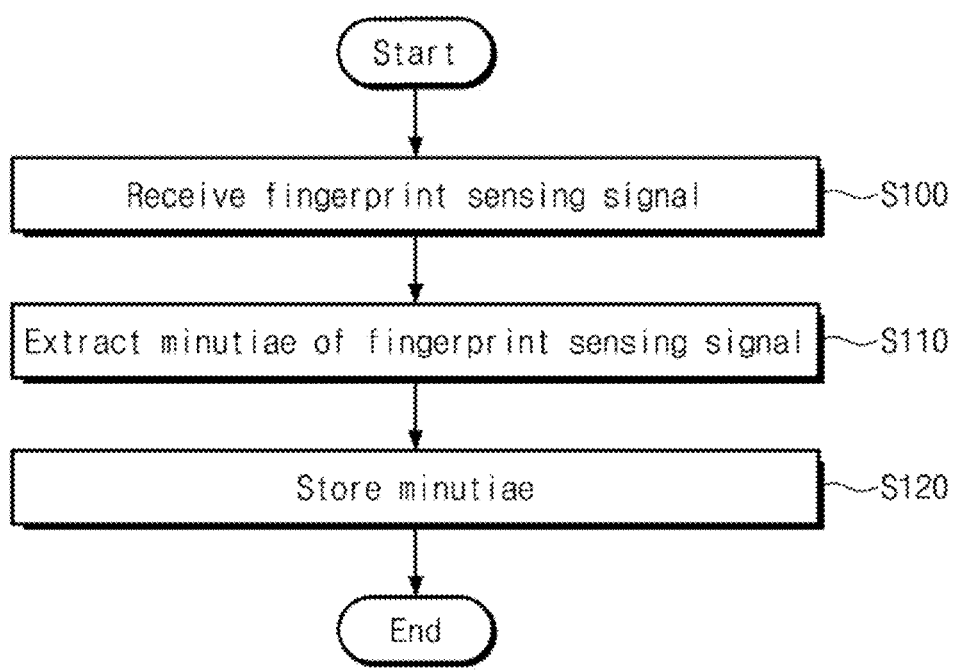
FIG. 6 is a flowchart diagram that illustrates a fingerprint registration method of a display device according to an exemplary embodiment of the present disclosure.

FIG. 6 illustrates a fingerprint registration method of a display device according to an exemplary embodiment of the present disclosure.

Referring to FIGS. 3, 5, and 6, a fingerprint sensing unit FSU of a display device DD senses a fingerprint by a user input TC of FIG. 1 in a fingerprint setting mode. The fingerprint sensing unit FSU provides a readout circuit ROC with a fingerprint sensing signal FS corresponding to the sensed fingerprint.

A minutiae extracting part 110 of the readout circuit ROC receives the fingerprint sensing signal FS from the fingerprint sensing unit FSU at step S100.

The minutiae extracting part 110 extracts minutiae of the fingerprint sensing signal FS and outputs a minutiae setting signal MI_S including the extracted minutiae at step S110.

A minutiae storage part 140 stores the minutiae setting signal MI_S from the minutiae extracting part 110 at step S120.

Figure 7:
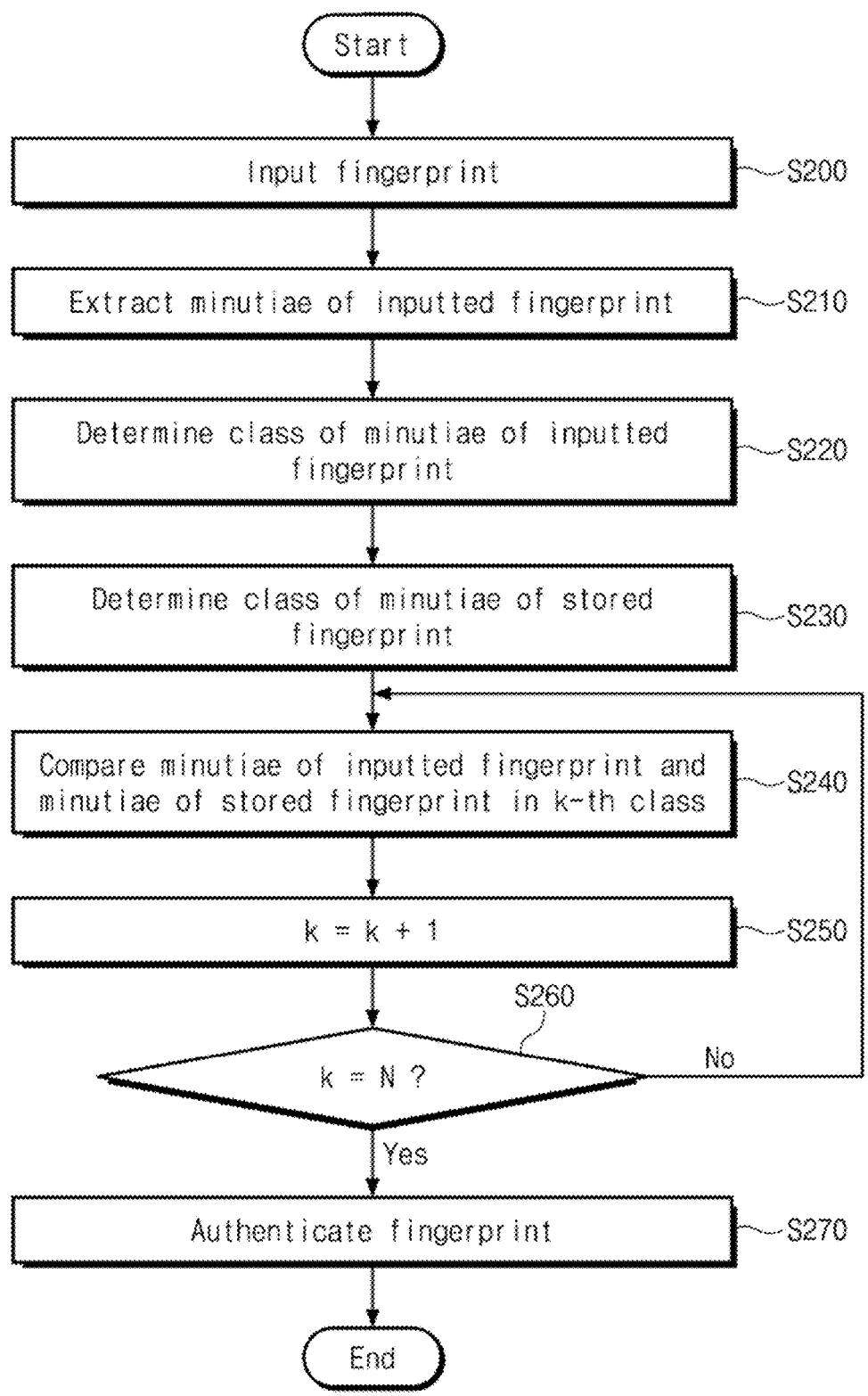
FIG. 7 is a flowchart diagram that illustrates a fingerprint authentication method of a display device according to an exemplary embodiment of the present disclosure.

FIG. 7 illustrates a fingerprint authentication method of a display device according to an exemplary embodiment of the present disclosure.

Referring to FIGS. 3, 5, and 7, the fingerprint sensing unit FSU of the display device DD senses a fingerprint by a user input TC of FIG. 1 in a fingerprint authentication mode. The fingerprint sensing unit FSU provides the readout circuit ROC with a fingerprint sensing signal FS corresponding to the sensed fingerprint.

At step S200, the minutiae extracting part 110 of the readout circuit ROC receives the fingerprint sensing signal FS from the fingerprint sensing unit FSU.

At step S210, the minutiae extracting part 110 extracts minutiae of the fingerprint sensing signal FS and outputs a minutiae detecting signal MI_D including the extracted minutiae.

At step S220, a minutiae matching part 120 determines a class of the minutiae of the inputted fingerprint. That is, the minutiae matching part 120 sets one minutia of the minutiae included in the minutiae detecting signal MI_D from the minutiae extracting part 110 as a center point of the fingerprint. The minutiae matching part 120 determines a class of each of minutiae, which are obtained by excluding the one minutia set as the center point of the fingerprint from the minutiae, depending on a distance and/or an angle, such as using polar coordinates, between each of the minutiae and the center point of the fingerprint. For example, the minutiae matching part 120 may determine each of the minutiae of the minutiae detecting signal MI_D as belonging to one of N number of classes, where N is a natural number.

At step S230, the minutiae matching part 120 determines a class of minutiae of a stored fingerprint. That is, the minutiae matching part 120 sets one minutia of minutiae included in a minutiae recall signal MI_M from the minutiae storage part 140 as a center point of the fingerprint. The minutiae matching part 120 determines a class of each of minutiae, which are obtained by excluding the one minutia set as the center point of the fingerprint from the minutiae, depending on a distance and/or an angle between each of the minutiae and the center point of the fingerprint. The minutiae matching part 120 may determine each of the minutiae of the minutiae recall signal MI_M as belonging to one of the N number of classes, where N is a natural number.

At step S240, the minutiae matching part 120 compares minutiae of the inputted fingerprint in a k-th class and minutiae of the stored fingerprint in the k-th class, where k is a natural number less than or equal to N. Specifically, the minutiae matching part 120 compares the minutiae of the minutiae detecting signal MI_D in the k-th class and the minutiae of the minutiae recall signal MI_M therein. The count value k may have an initial value of 1.

At step S250, the minutiae matching part 120 increases the count value k by one.

The minutiae matching part 120 repeatedly performs operations S240 and S250 until the count value k reaches N which is the number of the classes. The minutiae matching part 120 outputs a matching signal MAT corresponding to the comparison result to a determination part 130 when the count value k has reached N which is the number of the classes.

At step S260, the determination part 130 determines whether the inputted fingerprint matches the stored fingerprint on the basis of the matching signal MAT from the minutiae matching part 120, and, if not, returns control to step S240; or if so, outputs at step S270 a fingerprint authentication signal AUTH. The fingerprint authentication signal AUTH may be a signal indicating whether the inputted fingerprint matches the pre-stored fingerprint. For example, when the number of matched minutiae for minutiae of the minutiae detecting signal MI_D and minutiae of the minutiae recall signal MI_M in each of the N number of classes is greater than a preset value, the determination part 130 may determine that the inputted fingerprint matches the stored fingerprint.

Figure 8A:
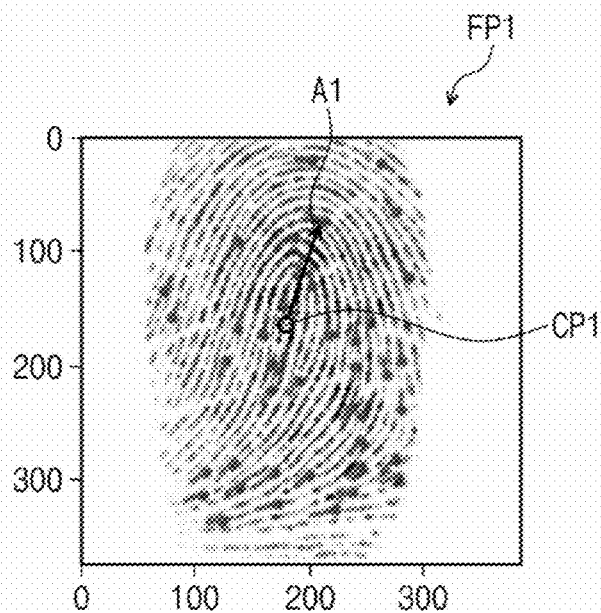
FIG. 8A is a scan diagram that illustrates a first fingerprint according to an exemplary embodiment of the present disclosure.
Figure 8B:
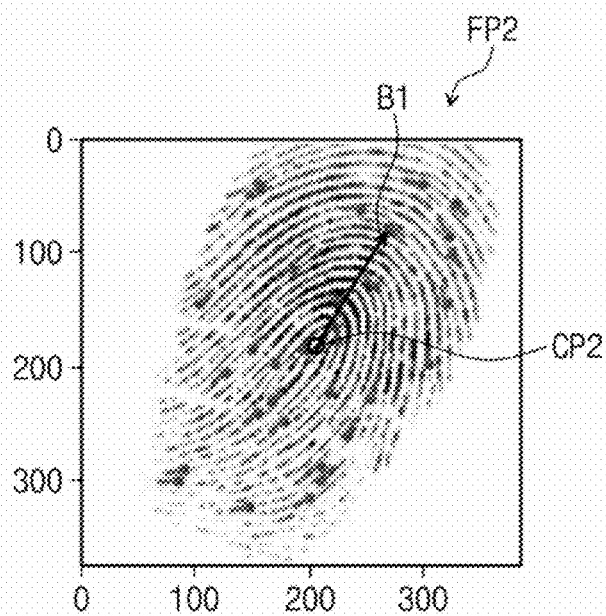
FIG. 8B is a scan diagram that illustrates a second fingerprint according to an exemplary embodiment of the present disclosure.

FIG. 8A illustrates a first fingerprint. FIG. 8B illustrates a second fingerprint.

Referring to FIGS. 8A and 8B, the first fingerprint FP1 and the second fingerprint FP2 might be fingerprints of the same user or fingerprints of different users. The first fingerprint FP1 has a first center point CP1 and a first minutia A1. The second fingerprint FP2 has a second center point CP2 and a second minutia B1.

As illustrated in FIGS. 8A and 8B, the positions of the first center point CP1 of the first fingerprint FP1 and the second center point CP2 of the second fingerprint FP2 are different from each other, and the slopes of the first fingerprint FP1 and the second fingerprint FP2 are different from each other, so that it might be difficult based on these measures alone to determine whether the first fingerprint FP1 matches the second fingerprint FP2.

Figure 9A:
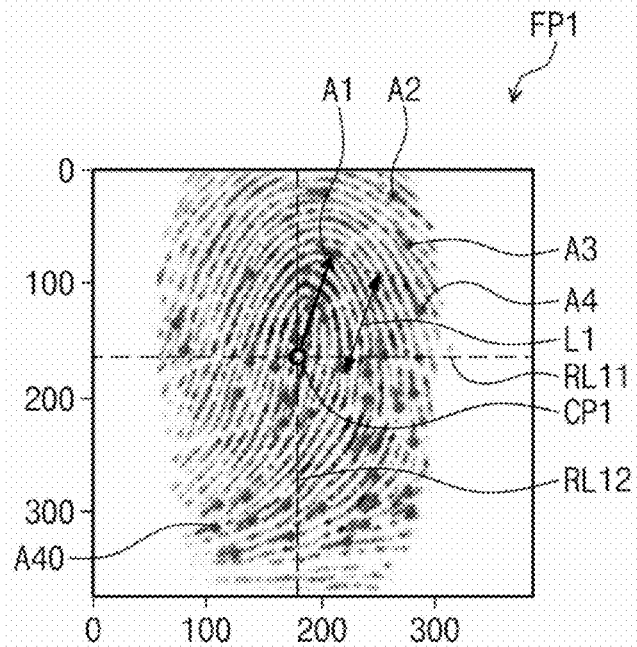
FIG. 9A is a scan diagram that illustrates a first fingerprint according to an exemplary embodiment of the present disclosure.
Figure 9B:
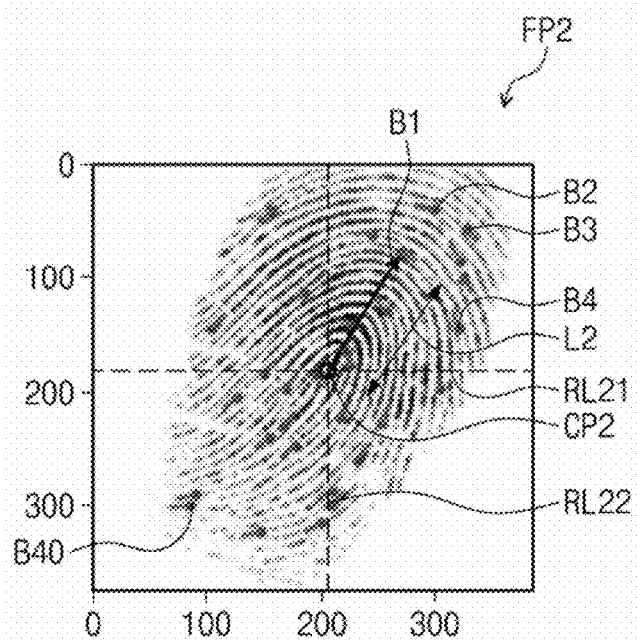
FIG. 9B is a scan diagram that illustrates a second fingerprint according to an exemplary embodiment of the present disclosure.

FIG. 9A illustrates the first fingerprint. FIG. 9B illustrates the second fingerprint.

Referring to FIGS. 5 and 9A, a first fingerprint FP1 includes a first center point CP1 and first minutiae A1 to A40. Although, in an exemplary embodiment, the first fingerprint FP1 is described to include the first center point CP1 and the 40 first minutiae A1 to A40 as an example, embodiments of the present disclosure are not limited thereto.

The minutiae extracting part 110 extracts the first center point CP1 and the first minutiae A1 to A40 of the first fingerprint FP1 from the fingerprint sensing signal FS, and outputs the minutiae detecting signal MI_D.

The minutiae matching part 120 sets to zero the first center point CP1 of the first fingerprint FP1 included in the minutiae detecting signal MI_D, and measures a first distance L1 between the first center point CP1 and the first minutia A1. The minutiae matching part 120 may determine a class of each of the first minutiae A1 to A40 depending on distances between the first center point CP1 and the first minutiae A1 to A40. For example, the first minutiae A1 and A4 at similar distances from the first center point CP1 may be determined as belonging to the same class.

Referring to FIGS. 5 and 9B, a second fingerprint FP2 includes a second center point CP2 and second minutiae B1 to B40. Although, in an exemplary embodiment, the second fingerprint FP2 is described to include the second center point CP2 and the 40 second minutiae B1 to B40 as an example, embodiments of the present disclosure are not limited thereto.

The minutiae matching part 120 sets to zero the second center point CP2 of the second fingerprint FP2 included in the minutiae recall signal MI_M provided from the minutiae storage part 140, and measures a second distance L2 between the second center point CP2 and the second minutia B1. The minutiae matching part 120 may determine a class of the second minutia B1 depending on the second distance L2 between the second center point CP2 and the second minutia B1. The minutiae matching part 120 may determine a class of each of the second minutiae B1 to B40 depending on distances between the second center point CP2 and the second minutiae B1 to B40. For example, the second minutiae B1 and B4 at similar distances from the second center point CP2 may be determined as belonging to the same class.

The minutiae matching part 120 may determine whether the first fingerprint FP1 matches the second fingerprint FP2 by comparing the first minutiae A1 to A40 of the first fingerprint FP1 included in the minutiae detecting signal MI_D with the second minutiae B1 to B40 of the second fingerprint FP2 included in the minutiae recall signal MI_M.

Figure 10:
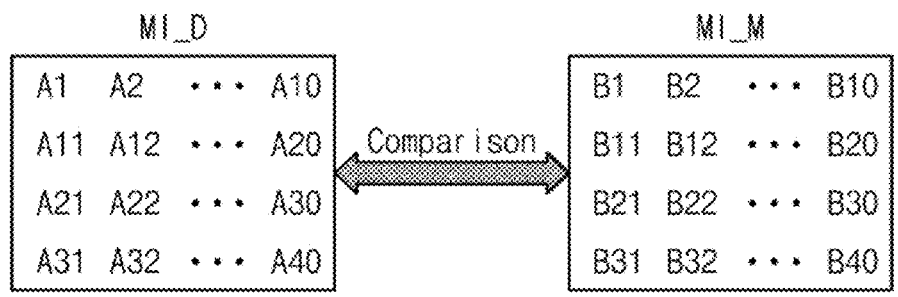
FIG. 10 is a comparative diagram for describing an operation of the minutiae matching part illustrated in FIG. 5.

FIG. 10 shows a view for describing an operation of the minutiae matching part 120 illustrated in FIG. 5.

Referring to FIGS. 5 and 10, the minutiae matching part 120 compares the minutiae detecting signal MI_D from the minutiae extracting part 110 with the minutiae recall signal MI_M from the minutiae storage part 140, and outputs the matching signal MAT corresponding to the comparison result.

The minutiae detecting signal MI_D may include the first minutiae A1 to A40 of the first fingerprint FP1 illustrated in FIG. 9A, and the minutiae recall signal MI_M may include the second minutiae B1 to B40 of the second fingerprint FP2 illustrated in FIG. 9B.

For example, in the case that the minutiae detecting signal MI_D includes the 40 first minutiae A1 to A40 and the minutiae recall signal MI_M includes the 40 second minutiae B1 to B40, the minutiae matching part 120 compares each of the first minutiae A1 to A40 with each of the second minutiae B1 to B40 to determine whether the first fingerprint FP1 matches the second fingerprint FP2. In this case, the minutiae matching part 120 requires a maximum of 40×40, that is, a maximum of 1600 minutiae comparison operations. Accordingly, as the number of minutiae included in the first fingerprint FP1 and the second fingerprint FP2 increases, more computational operations and time are required to compare the minutiae.

Figure 11:
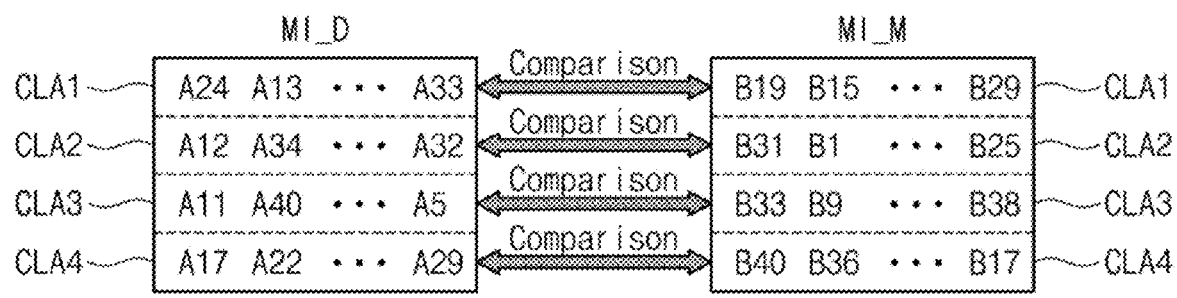
FIG. 11 is a comparative diagram for describing an operation of the minutiae matching part illustrated in FIG. 5.

FIG. 11 shows a view for describing an operation of the minutiae matching part 120 illustrated in FIG. 5.

Referring to FIGS. 5 and 11, the minutiae matching part 120 determines a class of each of the first minutiae of the minutiae detecting signal MI_D from the minutiae extracting part 110. The minutiae detecting signal MI_D may include the first minutiae A1 to A40 of the first fingerprint FP1 illustrated in FIG. 9A. The minutiae matching part 120 may classify each of the first minutiae A1 to A40 into any one of first to fourth classes CLA1 to CLA4 according to a predetermined criterion. For example, the minutiae matching part 120 may determine each of the first minutiae A1 to A40 as belonging to one of the first to fourth classes CLA1 to CLA4 depending on the distances between the first center point CP1 and the first minutiae A1 to A40 of the first fingerprint FP1. The minutiae matching part 120 may, among the first minutiae A1 to A40, determine ten first minutiae A24, A13, . . . , A33 closest to the first center point CP1 as belonging to the first class CLA1, determine ten first minutiae A12, A34, . . . , A32 second closest thereto as belonging to the second class CLA2, determine ten first minutiae A11, A40, . . . , A5 third closest thereto as belonging to the third class CLA3, and determine ten first minutiae A17, A22, . . . , A29 farthest from the first center point CP1 as belonging to the fourth class CLA4.

The minutiae matching part 120 determines a class of each of the minutiae of the minutiae recall signal MI_M from the minutiae storage part 140. The minutiae recall signal MI_M may include the second minutiae B1 to B40 of the second fingerprint FP2 illustrated in FIG. 9B. The minutiae matching part 120 may classify each of the second minutiae B1 to B40 into any one of the first to fourth classes CLA1 to CLA4 according to the predetermined criterion. For example, the minutiae matching part 120 may determine each of the second minutiae B1 to B40 as belonging to one of the first to fourth classes CLA1 to CLA4 depending on the distances between the second center point CP2 and the second minutiae B1 to B40 of the second fingerprint FP2. The minutiae matching part 120 may, among the second minutiae B1 to B40, determine ten second minutiae B19, B15, . . . , B29 closest to the second center point CP2 as belonging to the first class CLA1, determine ten second minutiae B31, B1, . . . , B25 second closest thereto as belonging to the second class CLA2, determine ten second minutiae B33, B9, . . . , B38 third closest thereto as belonging to the third class CLA3, and determine ten second minutiae B40, B36, . . . , B17 farthest from the second center point CP2 as belonging to the fourth class CLA4.

The minutiae matching part 120 compares the first minutiae A24, A13, . . . , A33 of the minutiae detecting signal MI_D determined as belonging to the first class CLA1 with the second minutiae B19, B15, . . . , B29 of the minutiae recall signal MI_M determined as belonging to the first class CLA1. The minutiae matching part 120 may determine similarity between the first minutiae A24, A13, . . . , A33 and the second minutiae B19, B15, . . . , B29.

The minutiae matching part 120 compares the first minutiae A12, A34, . . . , A32 of the minutiae detecting signal MI_D determined as belonging to the second class CLA2 with the second minutiae B31, B1, . . . , B25 of the minutiae recall signal MI_M determined as belonging to the second class CLA2. The minutiae matching part 120 may determine similarity between the first minutiae A12, A34, . . . , A32 and the second minutiae B31, B1, . . . , B25.

The minutiae matching part 120 compares the first minutiae A11, A40, . . . , A5 of the minutiae detecting signal MI_D determined as belonging to the third class CLA3 with the second minutiae B33, B9, . . . , B38 of the minutiae recall signal MI_M determined as belonging to the third class CLA3. The minutiae matching part 120 may determine similarity between the first minutiae A11, A40, . . . , A5 and the second minutiae B33, B9, B38.

The minutiae matching part 120 compares the first minutiae A17, A22, . . . , A29 of the minutiae detecting signal MI_D determined as belonging to the fourth class CLA4 with the second minutiae B40, B36, . . . , B17 of the minutiae recall signal MI_M determined as belonging to the fourth class CLA4. The minutiae matching part 120 may determine similarity between the first minutiae A17, A22, . . . , A29 and the second minutiae B40, B36, . . . , B17.

The minutiae matching part 120 requires a maximum of 10×10×4, that is, a maximum of 400 minutiae comparison operations.

The minutiae matching part 120 may provide a minutiae comparison result of a maximum of 400 operations to the determination part 130 as the matching signal MAT. The determination part 130 outputs the fingerprint authentication signal AUTH indicating whether the minutiae detecting signal MI_D matches the minutiae recall signal MI_M according to the matching signal MAT.

The comparison operation illustrated in FIG. 11 may improve the fingerprint authentication speed of the readout circuit ROC more than the comparison operation illustrated in FIG. 10 does.

In the example illustrated in FIG. 11, the minutiae matching part 120 has determined each of the first minutiae A1 to A40 as belonging to one of the first to fourth classes CLA1 to CLA4 depending on the distances between the first center point CP1 and the first minutiae A1 to A40 of the first fingerprint FP1, and has determined each of the second minutiae B1 to B40 as belonging to one of the first to fourth classes CLA1 to CLA4 depending on the distances between the second center point CP2 and the second minutiae B1 to B40 of the second fingerprint FP2.

In another embodiment, a minutiae matching part 120 may determine each of first minutiae A1 to A40 as belonging to one of first to fourth classes CLA1 to CLA4 depending on angles between the first minutiae A1 to A40 of a first fingerprint FP1 and any one of reference lines RL11 and RL12 of FIG. 9A that overlap a first center point CP1 of the first fingerprint FP1 and cross each other. Also, the minutiae matching part 120 may determine each of second minutiae B1 to B40 as belonging to one of the first to fourth classes CLA1 to CLA4 depending on angles between the second minutiae B1 to B40 of a second fingerprint FP2 and any one of reference lines RL21 and RL22 of FIG. 9B crossing a second center point CP2 of the second fingerprint FP2.

In another embodiment, the minutiae matching part 120 may determine each of first minutiae A1 to A40 as belonging to one of first to fourth classes CLA1 to CLA4 depending on angles between the first minutiae A1 to A40 of a first fingerprint FP1 and a reference line drawn from the center point CP1 in a direction defined by the fewest number of ridges and/or valleys within the fingerprint, or alternatively in a direction defined by the greatest number of ridges and/or valleys within a distance defined by the nearest edge of the fingerprint. Similarly, the minutiae matching part 120 may determine each of second minutiae B1 to B40 as belonging to one of the first to fourth classes CLA1 to CLA4 depending on angles between the second minutiae B1 to B40 of a second fingerprint FP2 and a reference line drawn from the center point CP2 in a direction defined by the fewest number of ridges and/or valleys within the fingerprint, or alternatively in a direction defined by the greatest number of ridges and/or valleys within a distance defined by the nearest edge of the fingerprint.

In another embodiment, a minutiae matching part 120 may determine each of first minutiae A1 to A40 as belonging to one of first to fourth classes CLA1 to CLA4 by using polar coordinates that take into account both distances between a first center point CP1 and the first minutiae A1 to A40 of a first fingerprint FP1 and angles between the first minutiae A1 to A40 and any one of reference lines RL11 and RL12 of FIG. 9A crossing the first center point CP1 of the first fingerprint FP1. Also, the minutiae matching part 120 may determine each of second minutiae B1 to B40 as belonging to one of the first to fourth classes CLA1 to CLA4 by using polar coordinates that take into account both distances between a second center point CP2 and the second minutiae B1 to B40 of a second fingerprint FP2 and angles between the second minutiae B1 to B40 and any one of reference lines RL21 and RL22 of FIG. 9B crossing the second center point CP2 of the second fingerprint FP2.

In the example illustrated in FIG. 11, a case that ten first minutiae correspond to each of the first to fourth classes CLA1 to CLA4 and ten second minutiae correspond to each of the first to fourth classes CLA1 to CLA4 is illustrated and described by way of example, but an embodiment of the present disclosure is not limited thereto. For example, the first class CLA1 to which some of the first minutiae closest to the first center point CP1 and some of the second minutiae closest to the second center point CP2 belong may include a relatively small number, such as 7, for example, of each of first minutiae and second minutiae. The fourth class CLA4 to which some of the first minutiae farthest from the first center point CP1 and some of the second minutiae farthest from the second center point CP2 belong may include a relatively large number, such as 12, for example, of each of first minutiae and second minutiae. In addition, the number of first minutiae and the number of second minutiae corresponding to a specific class may be different from each other. For example, the number of first minutiae that are closest to the first center point CP1 and thus correspond to the first class CLA1 may be Q1, and the number of second minutiae that are closest to the second center point CP2 and thus correspond to the first class CLA1 may be Q2. Here, each of Q1 and Q2 is a natural number, and Q1 and Q2 may be the same or different. For example, the number of first minutiae that are farthest from the first center point CP1 and thus correspond to the fourth class CLA4 may be R1, and the number of second minutiae that are farthest from the second center point CP2 and thus correspond to the fourth class CLA4 may be R2. Here, each of R1 and R2 is a natural number, and R1 and R2 may be the same or different.

The display device having such a configuration may classify minutiae of a detected fingerprint into the classes, and compare minutiae of the detected fingerprint belonging to one of the classes with minutiae of a stored fingerprint belonging to the one of the classes, thereby improving fingerprint authentication speed.

Although exemplary embodiments of the inventive concept have been described herein, it shall be understood that various changes and modifications may be made by those of ordinary skill in the pertinent art without departing from the spirit and scope of the inventive concept as defined by the following claims. The exemplary embodiments described herein are not intended to limit the technical spirit and scope of the present disclosure. Thus, all technical aspects within the scope or spirit of the following claims, or their equivalents, shall be construed as being included in the scope of the presently disclosed invention.

What is claimed is:

1. A device comprising:
   a fingerprint sensor configured to sense a fingerprint and output a corresponding fingerprint sensing signal; and
   a readout circuit configured to determine whether the fingerprint sensing signal matches a stored fingerprint signal,
   wherein the readout circuit comprises:
   a minutiae extracting part configured to extract first minutiae based on the fingerprint sensing signal and output a minutiae detecting signal indicative of the first minutiae;
   a minutiae storage part configured to provide a minutiae recall signal indicative of second minutiae based on the stored fingerprint signal;

a minutiae matching part configured to determine each of the first minutiae as belonging to any one of a plurality of classes, determine each of the second minutiae as belonging to any one of the plurality of classes, and compare first minutiae determined as belonging to each class of the plurality of classes with second minutiae determined as belonging to the same respective class of the plurality of classes to output a matching signal; and a determination part configured to output a fingerprint authentication signal in response to the matching signal, wherein the minutiae matching part determines each of the first minutiae as belonging to any one of the plurality of classes based on a first center point and the first minutiae of the minutiae detecting signal, and determines each of the second minutiae as belonging to any one of the plurality of classes based on a second center point and the second minutiae of the minutiae recall signal, wherein the minutiae matching part determines a first number of first minutiae closest by at least one of distance to the first center point or angle therethrough and a second number of second minutiae closest by at least one of distance to the second center point or angle therethrough as belonging to a first class of the plurality of classes, respectively.

2. The device of claim 1, wherein the minutiae matching part sequentially compares first minutiae and second minutiae for each class of the plurality of classes, and outputs the matching signal.

3. The device of claim 1, wherein the minutiae matching part determines each of the first minutiae as belonging to any one of the plurality of classes depending on distances between the first center point and the first minutiae of the minutiae detecting signal, and determines each of the second minutiae as belonging to any one of the plurality of classes depending on distances between the second center point and the second minutiae of the minutiae recall signal.

4. The device of claim 1, wherein the minutiae matching part determines each of the first minutiae as belonging to any one of the plurality of classes depending on angles between a first reference line overlapping the first center point of the minutiae detecting signal and the first minutiae of the minutiae detecting signal, and determines each of the second minutiae as belonging to any one of the plurality of classes depending on angles between a second reference line overlapping the second center point of the minutiae recall signal and the second minutiae of the minutiae recall signal.

5. The device of claim 1, wherein the minutiae extracting part extracts a center point, a ridge end, and a bifurcation of a fingerprint as the first minutiae based on the fingerprint sensing signal.

6. The device of claim 1, wherein
the minutiae extracting part extracts the second minutiae of the fingerprint sensing signal in a fingerprint setting mode and outputs a minutiae setting signal including the second minutiae, and
the minutiae storage part stores the minutiae setting signal and outputs the minutiae recall signal in response to a request from the minutiae matching part.

7. The device of claim 1 comprised by a display device, the display device further comprising:
a control module in signal communication with the fingerprint sensor and the readout circuit; and
a display panel in signal communication with the control module and configured to display an image responsive to the fingerprint authentication signal.

8. The device of claim 1, wherein the fingerprint authentication signal is a signal indicating whether the fingerprint sensing signal matches the stored fingerprint signal.

9. A device comprising:
a fingerprint sensor configured to sense a fingerprint and output a corresponding fingerprint sensing signal; and
a readout circuit configured to determine whether the fingerprint sensing signal matches a stored fingerprint signal,
wherein the readout circuit comprises:
a minutiae extracting part configured to extract first minutiae based on the fingerprint sensing signal and output a minutiae detecting signal indicative of the first minutiae;
a minutiae storage part configured to provide a minutiae recall signal indicative of second minutiae based on the stored fingerprint signal;
a minutiae matching part configured to determine each of the first minutiae as belonging to any one of a plurality of classes, determine each of the second minutiae as belonging to any one of the plurality of classes, and compare first minutiae determined as belonging to each class of the plurality of classes with second minutiae determined as belonging to the same respective class of the plurality of classes to output a matching signal; and
a determination part configured to output a fingerprint authentication signal in response to the matching signal,
wherein the minutiae matching part determines each of the first minutiae as belonging to any one of the plurality of classes depending on distances between a first center point and the first minutiae of the minutiae detecting signal, and determines each of the second minutiae as belonging to any one of the plurality of classes depending on distances between a second center point and the second minutiae of the minutiae recall signal,
wherein the minutiae matching part determines a first number of first minutiae closest to the first center point and a second number of second minutiae closest to the second center point as belonging to a first class of the plurality of classes.

10. The device of claim 9, wherein the minutiae matching part compares the first minutiae and the second minutiae determined as belonging to the first class.

11. The device of claim 9, wherein the minutiae matching part determines third number of first minutiae farthest from the first center point and a fourth number of second minutiae farthest from the second center point as belonging to a last class of the plurality of classes.

12. The device of claim 11, wherein the minutiae matching part compares the first minutiae and the second minutiae determined as belonging to the last class.

13. A method comprising:
receiving a fingerprint sensing signal responsive to a first fingerprint;
extracting first minutiae based on the fingerprint sensing signal, and providing a minutiae detecting signal indicative of the first minutiae;
receiving a minutiae recall signal responsive to a second fingerprint and indicative of second minutiae;
determining each of the first minutiae as belonging to any one of a plurality of classes based on a first center point and the first minutiae of the minutiae detecting signal;

determining each of the second minutiae as belonging to any one of the plurality of classes based on a second center point and the second minutiae of the minutiae recall signal;

for each class of the plurality of classes, comparing the first minutiae of the class with the second minutiae of the class by determining a first number of first minutiae closest by at least one of distance to the first center point or angle therethrough and a second number of second minutiae closest by at least one of distance to the second center point or angle therethrough as belonging to the class, respectively;

providing a matching signal responsive to the comparing; and outputting a fingerprint authentication signal in response to the matching signal.

14. The method of claim 13, wherein the outputting of the matching signal comprises determining each of the first minutiae as belonging to any one of the plurality of classes depending on distances between the first center point and the first minutiae of the minutiae detecting signal, and determining each of the second minutiae as belonging to any one of the plurality of classes depending on distances between the second center point and the second minutiae of the minutiae recall signal.

15. The method of claim 13, wherein the outputting of the matching signal comprises determining each of the first minutiae as belonging to any one of the plurality of classes depending on angles between a first reference line overlapping the first center point of the minutiae detecting signal and that of the first minutiae of the minutiae detecting signal, and determining each of the second minutiae as belonging to any one of the plurality of classes depending on angles between a second reference line overlapping the second center point of the minutiae recall signal and that of the second minutiae of the minutiae recall signal.

* * * * *